US012628151B2

(12) United States Patent
Yang et al.

(10) Patent No.: US 12,628,151 B2
(45) Date of Patent: May 12, 2026

(54) SYSTEM AND METHOD FOR HIERARCHICAL MANAGEMENT OF RADIO RESOURCES

(71) Applicant: Verizon Patent and Licensing Inc., Basking Ridge, NJ (US)

(72) Inventors: Jin Yang, Orinda, CA (US); Steven F. Rice, Keller, TX (US); William H. Stone, Doylestown, PA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 371 days.

(21) Appl. No.: 18/338,751

(22) Filed: Jun. 21, 2023

(65) Prior Publication Data

US 2024/0430878 A1     Dec. 26, 2024

(51) Int. Cl.
*H04W 28/02* (2009.01)
*H04W 48/18* (2009.01)
*H04W 72/12* (2023.01)
*H04W 72/543* (2023.01)

(52) U.S. Cl.
CPC ................................... *H04W 72/12* (2013.01)

(58) Field of Classification Search
None
See application file for complete search history.

(56) References Cited

U.S. PATENT DOCUMENTS

| | | | | |
|---|---|---|---|---|
| 2018/0159802 A1* | 6/2018 | Bao | ..................... | H04L 49/9042 |
| 2020/0396631 A1* | 12/2020 | Han | ................. | H04W 28/0268 |
| 2021/0120484 A1* | 4/2021 | Thorat | .................... | H04L 41/40 |
| 2021/0218679 A1* | 7/2021 | Chong | ............. | H04W 28/0992 |
| 2021/0250803 A1* | 8/2021 | Breuer | ................. | H04W 48/18 |
| 2022/0030475 A1* | 1/2022 | Yao | ................... | H04W 36/0085 |
| 2022/0086082 A1* | 3/2022 | Saad | ...................... | H04L 45/50 |
| 2023/0370899 A1* | 11/2023 | Geng | ................. | H04L 41/0893 |
| 2023/0422085 A1* | 12/2023 | Babbellapati | ..... | H04W 28/0268 |
| 2024/0259260 A1* | 8/2024 | Mindel | ................. | H04W 24/02 |

* cited by examiner

*Primary Examiner* — Sai Aung

(57) ABSTRACT

A radio resource partitioning system may be configured to: divide a resource grid into first partitions based on: subscriber profile identifiers (SPIDs); a combination of SPIDs and network slice identifiers (IDs); or one or more network slice IDs and no SPID. The radio resource partitioning system may further divide the first partitions into second partitions based on Fifth Generation (5G) Quality-of-Service (QoS) Identifiers (5QIs) or QoS class Identifiers (QCIs); generate partition information based on the first partitions and the second partitions; and provide the partition information to a scheduler for scheduling data for transmission to or reception from a User Equipment device (UE).

20 Claims, 9 Drawing Sheets

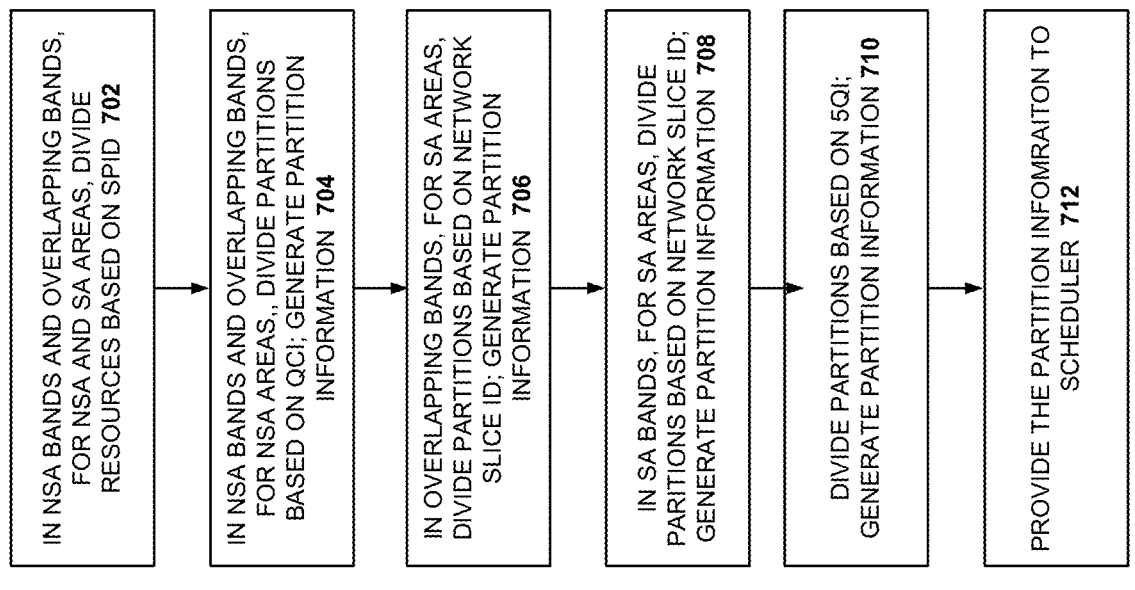

IN NSA BANDS AND OVERLAPPING BANDS, FOR NSA AND SA AREAS, DIVIDE RESOURCES BASED ON SPID  702

IN NSA BANDS AND OVERLAPPING BANDS, FOR NSA AREAS, DIVIDE PARTITIONS BASED ON QCI; GENERATE PARTITION INFORMATION  704

IN OVERLAPPING BANDS, FOR SA AREAS, DIVIDE PARTITIONS BASED ON NETWORK SLICE ID; GENERATE PARTITION INFORMATION  706

IN SA BANDS, FOR SA AREAS, DIVIDE PARTITIONS BASED ON NETWORK SLICE ID; GENERATE PARTITION INFORMATION  708

DIVIDE PARTITIONS BASED ON 5QI; GENERATE PARTITION INFORMATION  710

PROVIDE THE PARTITION INFOMRAITON TO SCHEDULER  712

700 ──→

750

800 →

SYSTEM AND METHOD FOR HIERARCHICAL MANAGEMENT OF RADIO RESOURCES

BACKGROUND INFORMATION

In the early deployment of Fifth Generation (5G) New Radio (NR) networks, many mobile network operators (MNOs) built their 5G networks using a combination of 4G equipment and 5G equipment based on a non-standalone (NSA) network architecture. In a non-standalone architecture, a 5G radio access network (RAN) interoperates with 4G Long Term Evolution (LTE) RAN, a 4G core network, and/or 5G core network. For many MNOs, 5G NR non-standalone networks serve as a steppingstone for transitioning from legacy 4G LTE networks to 5G standalone (SA) networks. Although 5G NR standalone networks are becoming more prevalent, many carriers retain both 5G NR standalone networks and 5G NR non-standalone networks.

BRIEF DESCRIPTION OF THE DRAWINGS

FIG. 2 illustrates an exemplary network environment in which systems and methods described herein may be implemented;

FIG. 4A illustrates an access station configured to operate as a Fifth Generation (5G) New Radio (NR) standalone access station, according to an implementation;

FIG. 4B illustrates access stations configured to operate as 5G NR non-standalone access stations, according to an implementation;

FIG. 7A is a flow diagram of an example process for generating partition information, according to an implementation;

DETAILED DESCRIPTION

The following detailed description refers to the accompanying drawings. The same reference numbers in different drawings may identify the same or similar elements.

Systems and methods described herein relate to hierarchical management of radio resources. In 5G networks, network slicing (to be described below) may play a key role in providing many 5G communication services. To advance further use of network slicing, many MNOs are implementing 5G New Radio (NR) standalone (SA) networks. Currently, however, 5G NR SA coverage is limited, and it may take time for the coverage to match that of 5G NR non-standalone (NSA) networks. The systems and methods described herein provide for hierarchical management of radio resources across 5G SA and 5G NSA networks to advance the use of network slicing while accommodating the use of Subscriber Profile Identifiers (SPIDs) in 5G NSA networks, to meet Service Level Agreements. The hierarchical management may entail dividing radio resources into partitions and priority-based radio resource allocation to ensure consistent user experience across 5G NR SA coverage areas and 5G NR NSA coverage areas. According to systems described herein, users that are assigned to a high Quality-of-Service (QoS) network slice and to a high-priority SPID may be given the highest priority. That is, when a base station schedules data for downlink/uplink transmission to/from a User Equipment device (UE) of the user, the base station may give the highest priority to the data associated with particular network slices and SPIDs.

Figure 1:
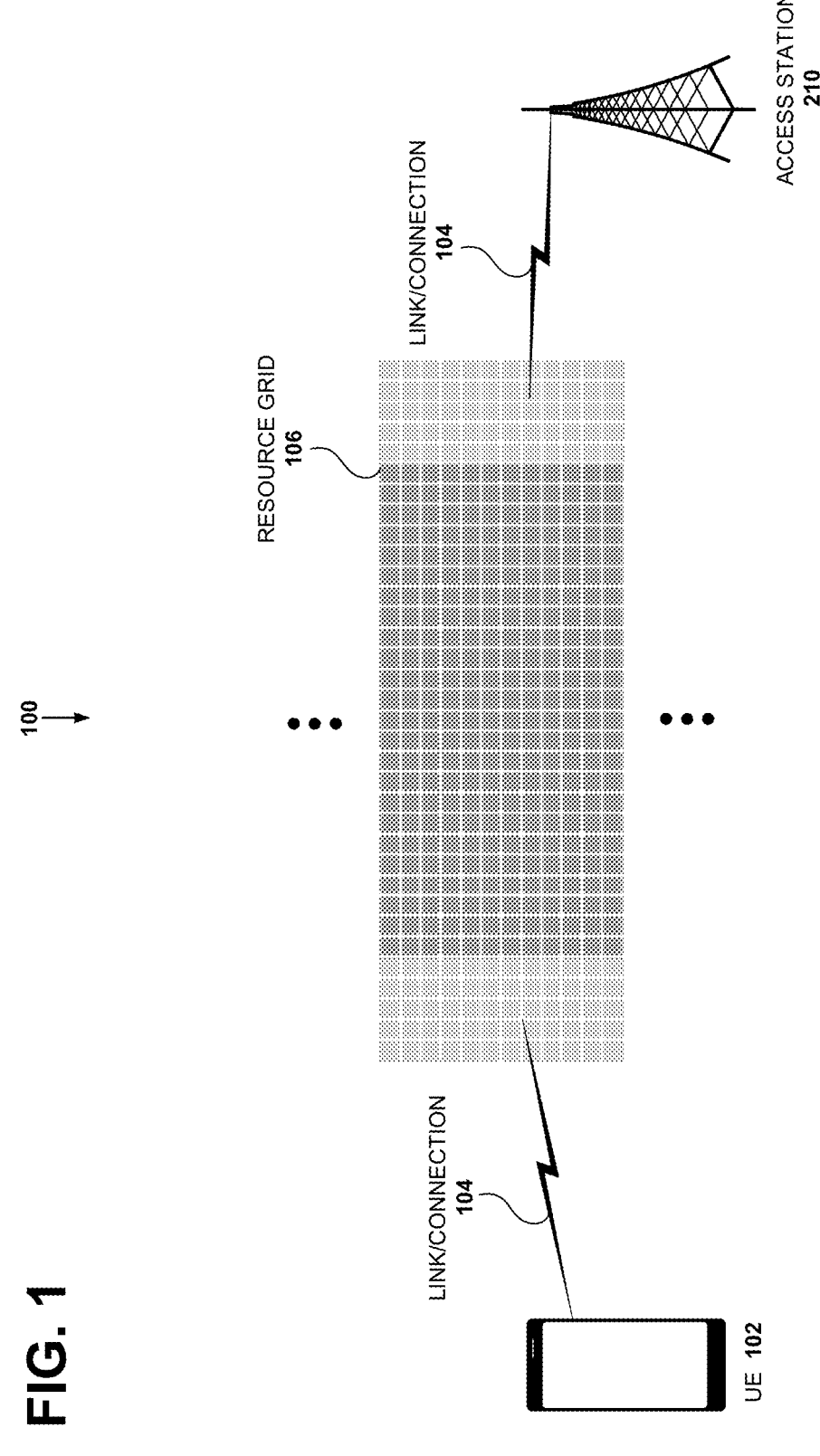
FIG. 1 illustrates concepts described herein.

FIG. 1 illustrates concepts described herein. As shown, in environment 100, a UE 102 establishes a radio frequency (RF) communication link 104 with an access station 210 (e.g., a base station). UE 102 and access station 210 may exchange symbols (e.g., Orthogonal Frequency Division Multiplexing (OFDM) symbols) over link 104, which may encompass a range of frequencies and time intervals. In FIG. 1, the frequencies and the time intervals form a radio resource grid 106. Radio resource grid 106 may comprise physical resource blocks (PRBs), each of which in turn comprises resource elements. When access station 210 is scheduling data for downlink transmission or uplink reception, access station 210 may identify radio resources (PRBs or resource elements) that the data will occupy and assign the identified radio resources to the data. Access station 210 may transmit or receive the scheduled data in accordance with the assigned radio resources.

Access station 210 may be implemented to operate in SA-only frequency bands (frequency bands only used with SA architecture), in SA and NSA overlapping bands (frequency bands used with both SA and NSA architecture), and in NSA-only frequency bands. In SA-only frequency bands, access station 210 may be implemented as an SA access station; in the overlapping bands, as either an SA access station or an NSA access station; and in the NSA-only band, as an NSA access station.

Depending on whether access station 210 is operating as an SA access station in the SA-only frequency bands, an SA access station in the overlapping bands, an NSA access station in the NSA-only frequency bands, or NSA access station in the overlapping bands, access station 210 may divide radio resource grid 106 into partitions based on network slice IDs, a combination of network slice IDs and SPIDs, or network SPIDs. Each of the partitions may be further divided into smaller partitions based on either a 5G QoS Index (5QI) or QoS Class Index (QCI), which may be associated with data priorities. As the result of partitioning, access station 210 may generate partition information, which identifies the partitions, and, for each of the partitions, either the corresponding 5QIs or the corresponding QCIs.

During traffic congestion, access station 210 may determine priorities for data based on 5QIs/QCIs and schedule the data for transmission or reception over the corresponding partition in accordance with the priorities. Hence, access station 210 and other network components provide for hierarchical management of radio resources across 5G SA and 5G NSA networks to advance the use of network slicing while accommodating the use of SPIDs, to meet Service Level Agreements.

Figure 2:
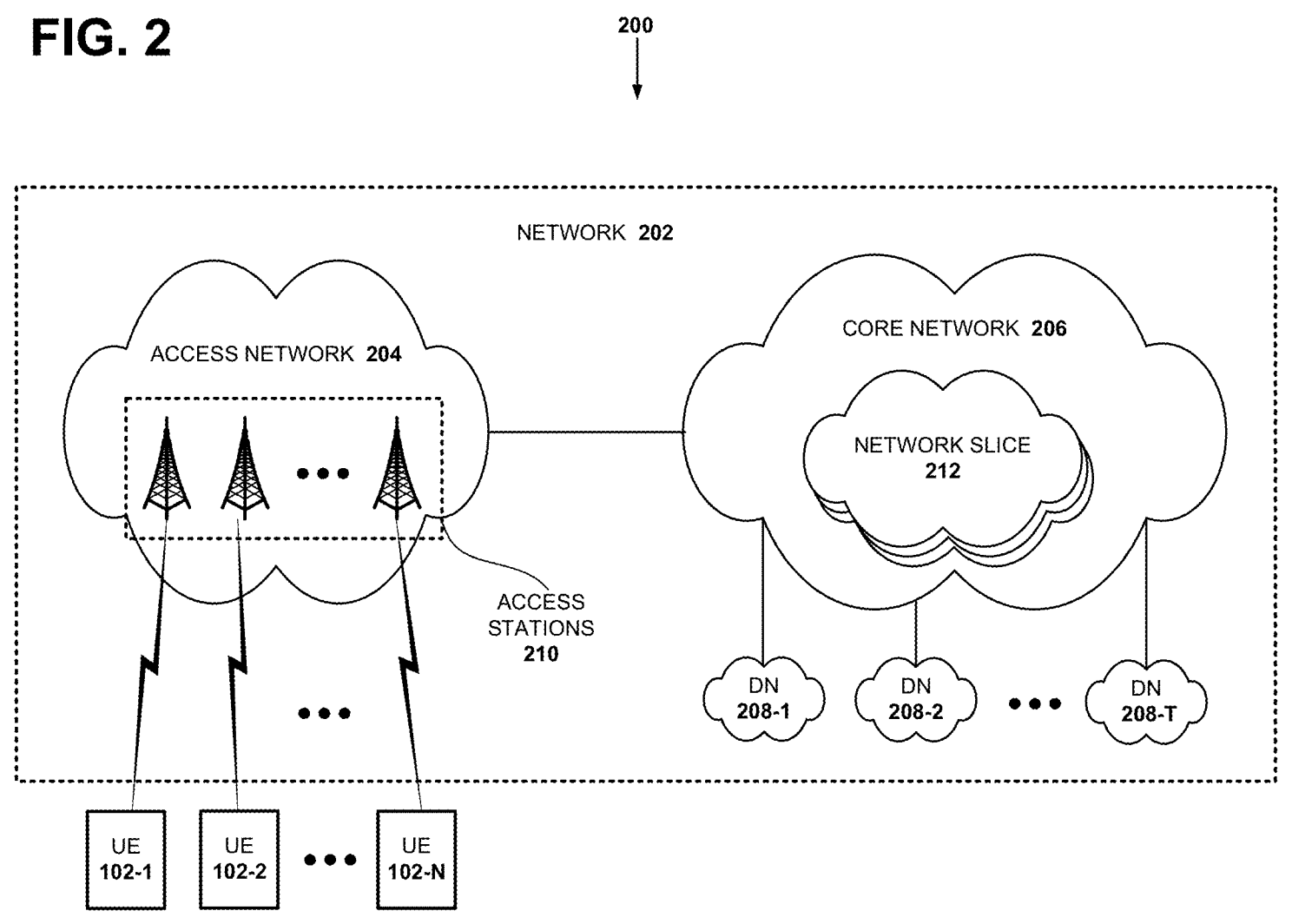

FIG. 2 illustrates an exemplary network environment 200 in which the systems and methods described herein may be implemented. As shown, network environment 200 may include UEs 102-1 through 102-N (collectively referred to as UEs 102 and generically referred to as UE 102), access network 204, core network 206, and data networks (DNs) 208-1 through 208-T (collectively referred to as data networks 208 and generically as data network 208). Access network 204, core network 206, and data networks 208 may be part of a cellular network (also referred to as provider network 202 or simply as network 202).

UEs 102 may include a wireless communication devices capable of 4G (e.g., Long-Term Evolution (LTE)) communication and/or 5G NR communication. Examples of UE 102 include: a Fixed Wireless Access (FWA) device; a Customer Premises Equipment (CPE) device with 4G and 5G capabilities; a smart phone; a tablet device; a wearable computer device (e.g., a smart watch); a global positioning system (GPS) device; a laptop computer; a media playing device; a portable gaming system; an autonomous vehicle navigation system; a sensor; and an Internet-of-Things (IoT) device. In some implementations, UE 102 may include a wireless Machine-Type-Communication (MTC) device that communicates with other devices over a machine-to-machine (M2M) interface, such as LTE-M or Category M1 (CAT-M1) devices and Narrow Band (NB)-IoT devices.

In 5G and 4G networks, a user of UE 102 may be associated with a SPID and/or a network slice IDs. SPID may be used for radio resource management in network 202 (e.g., handover, cell reselection, etc.). Each SPID may designate a group of users associated with particular frequencies and cell types. Radio resource elements for a particular UE 102 may be scheduled based on a priority that is associated with each SPID. In some implementations, Radio Access Technology/Frequency Selection Priority ID (RFSP ID) may be used in place of SPID. Network slice IDs are described below.

Access network 204 may allow UE 102 to access core network 206. To do so, access network 204 may establish and maintain, with participation from UE 102, an over-the-air channel with UEs 102; and maintain backhaul channels with core network 206. Access network 204 may relay information through such channels, from UEs 102 to core network 206 and vice versa. Access network 204 may include an LTE radio access network and/or a 5G NR access network, or another advanced radio access network. These networks may include many central units (CUs), distributed units (DUs), radio units (RUs), and wireless stations, some of which are illustrated in FIG. 2 as access stations 210 for establishing and maintaining over-the-air channels with UEs 102. In some implementations, access station 210 may include a 4G, 5G, or another type of base station that includes one or more radio frequency (RF) transceivers. In some implementations, access station 210 may be part of an evolved Universal Mobile Telecommunications Service (UMTS) Terrestrial Radio Access Network (eUTRAN).

In some implementations, access stations 210 may be configured in accordance with a 5G NR NSA architecture and/or in accordance with a 5G NR SA architecture. In the 5G NR SA architecture, access station 210 may be coupled to 5G core network components (to be described below); In the 5G NR NSA architecture, access station 210 may be coupled to 4G core network components. As further described below, access stations 210 may include at least part of the system for hierarchical management of radio resources, whether the access stations 210 are in the 5G SA configuration or the 5G NSA configuration. A portion of the system, located within access stations 210, may perform radio resource partitioning and priority-based radio resource allocation for data transmission/reception scheduling, to ensure consistent user experience across 5G NR SA coverage areas and 5G NR NSA coverage areas.

Core network 206 may manage communication sessions of subscribers connecting to core network 206 via access network 204. For example, core network 206 may establish an Internet Protocol (IP) connection between UEs 102 and data networks 204. The components of core network 206 may be implemented as dedicated hardware components or as virtualized functions implemented on top of a common shared physical infrastructure using Software Defined Networking (SDN). For example, an SDN controller may implement one or more of the components of core network 206 using an adapter implementing a virtual network function (VNF) virtual machine, a Cloud Native Function (CNF) container, an event driven serverless architecture interface, and/or another type of SDN component. The common shared physical infrastructure may be implemented using one or more devices 800 described below with reference to FIG. 8 in a cloud computing center associated with core network 206.

Core network 206 may include 5G core network components, 4G core network components, and/or another type of core network components. These components may be part of or may support the system for hierarchical management of radio resources. Some of these components are described in greater detail with reference to FIG. 3.

As further shown, core networks 206 may each include one or more network slices 212. Depending on the embodiment, network slices 212 may be implemented within other networks, such as access network 204 and/or data network 208. Access network 204, core networks 206, and data networks 208 may include multiple instances of network slice 212 (collectively referred to as network slices 212). Each network slice 212 may be instantiated as a result of "network slicing," which involves a form of virtual network architecture that enables multiple logical networks to be implemented on top of a shared physical network infrastructure using software defined networking (SDN) and/or network function virtualization (NFV). Each logical network, referred to as a "network slice," may encompass an end-to-end virtual network with dedicated storage and/or computational resources that include access network components, clouds, transport, Central Processing Unit (CPU) cycles, memory, etc. Furthermore, each network slice 212 may be configured to meet a different set of requirements and may be associated with a particular QCI, a type of service, 5QI, and/or a particular group of enterprise customers associated with communication devices. Network slices 212 may be capable of supporting enhanced Mobile Broadband (eMBB) traffic, Ultra Reliable Low Latency Communication (URLLC) traffic, Time Sensitive Network (TSN) traffic, Massive IoT (MIoT) traffic, Vehicle-to-Everything (V2X) traffic, High performance Machine Type Communication (HMTC) traffic, and other customized traffic, for example.

Each network slice 212 may be associated with an identifier, herein referred to as a Single Network Slice Selection Assistance Information (S-NSSAI) and/or a network slice instance ID. Each UE 102 that is configured to access a particular network slice 212 may be associated with corresponding data, stored in core network 206 for example, which includes the S-NSSAI that identifies the network slice 212.

Data networks 208 may include one or more networks connected to core networks 206. In some implementations, a particular data network 208 may be associated with a data network name (DNN) in 5G and/or an Access Point Name (APN) in 4G. UE 102 may request a connection to data network 208 using a DNN or APN. Each data network 208 may include, and/or be connected to and enable communications with a local area network (LAN), a wide area network (WAN), a metropolitan area network (MAN), an autonomous system (AS) on the Internet, an optical network, a cable television network, a satellite network, another wireless network (e.g., a Code Division Multiple Access (CDMA) network, a general packet radio service (GPRS) network, and/or an LTE network), an ad hoc network, a telephone network (e.g., the Public Switched Telephone Network (PSTN) or a cellular network), an intranet, or a combination of networks. Data network 208 may include an application server (also referred to as application). An application may provide services for a program or an application running on UEs 102 and may establish communication sessions with UEs 102 via core network 206.

For clarity, FIG. 2 does not show all components that may be included in network environment 200 (e.g., routers, bridges, wireless access points, additional networks, additional access stations 210, data centers, portals, etc.). Depending on the implementation, network environment 200 may include additional, fewer, different, or a different arrangement of components than those illustrated in FIG. 2.

Figure 3:
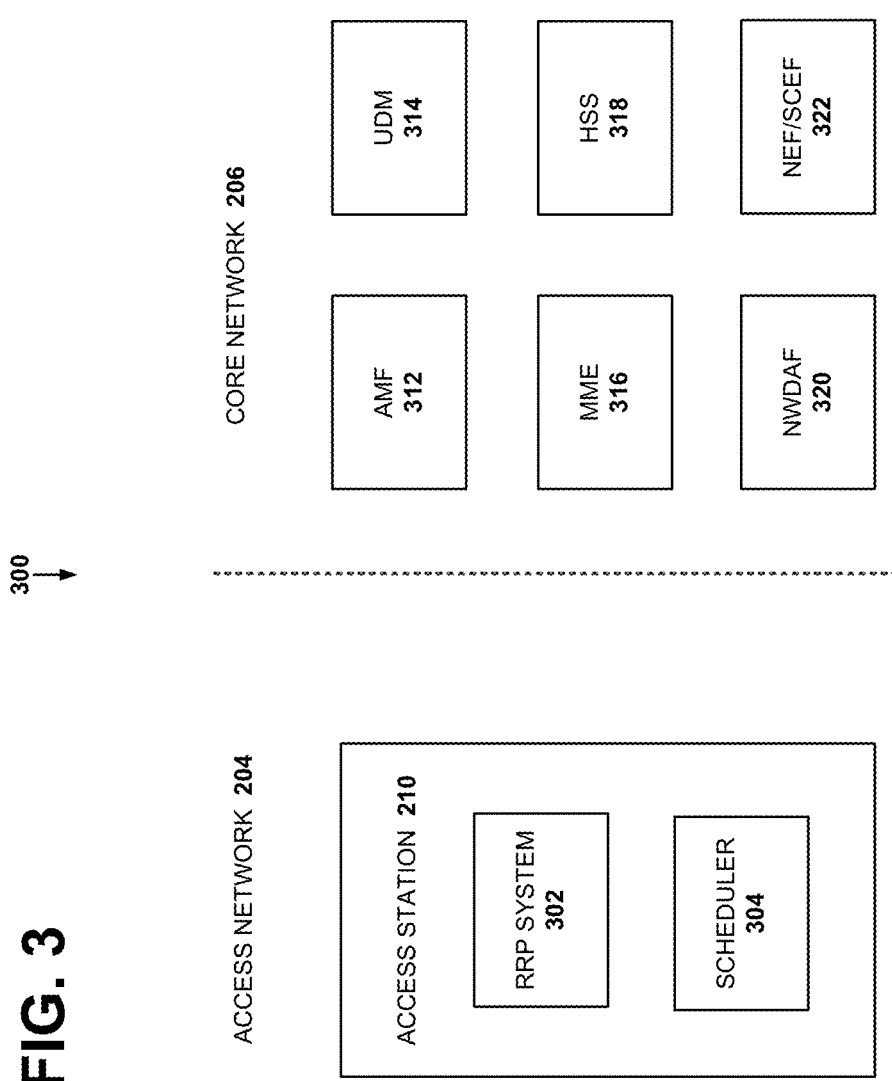
FIG. 3 depicts example functional components of a system for hierarchical management of radio resources, according to an implementation.

FIG. 3 depicts example functional components of a system 300 for hierarchical management of radio resources, according to an implementation. As shown, system 300 may include components of access network 204 and core network 206. Access network 204 may comprise access station 210, which in turn, may comprise a Radio Resource Partitioning (RRP) system 302 and a scheduler 304. Core network 206 may include 5G core network components, such as Access and Mobility Management Function (AMF) 312, a Unified Data Management function (UDM) 314, a Network Data Analytics Function (NWDAF) 320, and a Network Exposure Function (NEF), and/or 4G core network components, such as Mobility Management Entity (MME) 316 and Home Subscriber Server (HSS) 318. Depending on the implementation, system 300 may include additional, fewer, or different components of access network 204, access station 210, and/or core network 206 than those illustrated in FIG. 3. For example, system 300 may not include AMF 312 or NWDAF 320 but include other 5G core network components, such as Authentication Server Function (AUSF), a Session Management Function (SMF), a Charging Function (CHF), a Policy Control Function (PCF), etc.

Figures 4A, 4B:
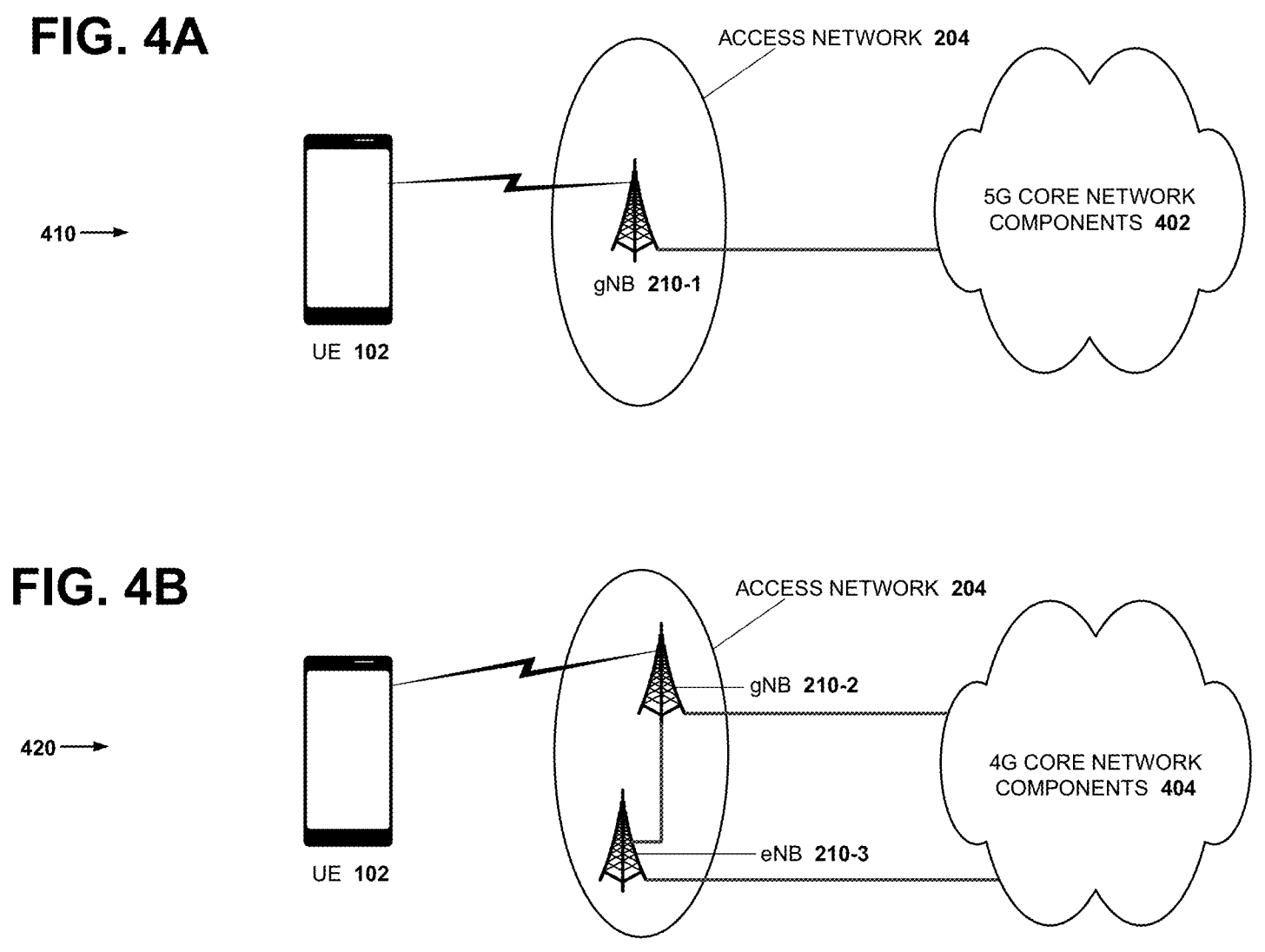

RRP system 302 may divide resource grid 106 into one or more radio resource partitions. The resources of each partition may be contiguous or non-contiguous in frequency. RRP system 302 may divide resource grid 106 into partitions based on a number of factors: whether access station 210, in which RRP system 302 is hosted, is configured as an SA access station 210 or an NSA access station; whether access station 210 is operating in the SA-only frequency bands, the NSA-only frequency bands, or in the overlapping frequency bands; SPIDs and network slice IDs; and the conditions of communication channels of access station 210. FIG. 4A illustrates access station 210 which is configured to operate as a SA access station—a gNB 210-1. As shown, gNB 210-1 may permit UE 102 to access 5G core network components 402. FIG. 4B illustrates access stations 210 which are configured to operate as NSA access stations 210—a gNB 210-2 and an eNB 210-3. As shown, gNB 210-2 and eNB 210-3 may be coupled to one another, as well as to 4G core network components 404 through backhaul links. In FIG. 4B, NSA access stations interoperate with 4G core network components to provide communication services to UE 102.

If access station 210 that hosts RRP system 302 is an SA access station operating in the overlapping bands, based on information that RRP system 302 receives via its interface from other network components, RRP system 302 may assign, to each of SPIDs and/or network slices (e.g., network slices identified by S-NSSAIs or network slice instance IDs), a radio resource partition in the overlapping bands. If access station 210 that hosts RRP system 302 is an SA access station operating in the SA-only bands, based on information that RRP system 302 receives via its interface from other network components, RRP system 302 may assign, to each of network slices 212, a radio resource partition in the SA-only bands.

If access station 210 that hosts RRP system 302 is an NSA access station operating in the overlapping bands or the NSA-only bands, based on information that RRP system 302 receives via its interface from other network components, RRP system 302 may assign, to each of SPIDs, a radio resource partition in the overlapping bands or the NSA-only bands.

After dividing resource grid 106 into partitions, RRP system 302 may further divide each of the partitions that correspond to network slice IDs or SPIDs into smaller partitions based on either QCIs or 5QIs. While dividing resource grid 106 or partitions into smaller partitions, RRP system 302 may generate partition information (e.g., the network slice ID/the SPID, 5QIs, QCIs, and/or information identifying the corresponding partition assigned to the network slice ID, the SPID, the QCIs, or the 5QIs). RRP system 302 may provide the generated partition information to scheduler 304.

In generating partitions or in generating partition information, RRP system 302 may use information that it obtains from other network components, via its interface. The obtained information may include information about network slices (e.g., network slice IDs and QoS associated with each network slice ID), about SPIDs (e.g., QCI associated with each SPID), network traffic (e.g., volume of traffic for the channels of access station 210), and/or a QoS index (e.g., 5QI or QCI) associated with a particular UE 102 traffic.

In some implementations, RRP system 302 may include an Artificial Intelligence (AI)/Machine learning (ML) model (e.g., an artificial neural network, a random forest, a K-means clustering, a gradient boosted machine, etc.). Such an AI/ML may be trained to generate partitions and output partition information. To train AI/ML model, RRP system 302 may use the information obtained via its interface and partition information that it generates. Once the AI/ML model is trained, RRP system 302 may input information that it obtains via its interface into the AI/ML model and provide partition information output from the AI/ML model to scheduler 304.

Scheduler 304 may schedule data for transmission or reception over particular radio resources. Scheduler 304 may assign data to particular radio resources for transmission or reception based on priorities associated with the data. Scheduler 304 may determine the priorities by using 5QIs or QCIs. During traffic congestion, when scheduling data associated with a particular UE 102, scheduler 304 may determine a radio resource partition for the UE 102 based on partition information that scheduler 304 received from RRP system 302. Next, scheduler 304 may determine a particular QCI or 5QI for the data, by looking up a table that maps each UE data to a QCI/5QI. Furthermore, by using the determined QCI/5QI, scheduler 304 may determine the priority of the data.

Next, based on the priority and priorities of other data to be sent over the partition, scheduler 304 may schedule the data for transmission or reception, by assigning the data to radio resources of the partition corresponding to the 5QI/

QCI. Depending on the condition of the channel, the radio resource partition for each network slice ID/SPID/QCI/5QI may change over time. For example, when the channels are not congested, scheduler 304 may be provided with no partition or a large partition, whereas when the channels are congested, scheduler 304 may be provided with a partition reserved for the network slice ID/SPID/5QI/QCI for UE 102.

AMF 312 may perform registration management, connection management, reachability management, mobility management, lawful intercepts, Short Message Service (SMS) transport between UE 102 and a Short Message Service Function (SMSF), session management messages transport between UE 102 and a Session Management Function (SMF), access authentication and authorization, location services management, functionality to support non-Third Generation Partnership Program (3GPP) access networks, and/or other types of management processes. AMF 312 may provide network traffic information pertaining to UE 102 or network slices to other network components, such as RRP system 302, either directly or indirectly via NEF 322.

UDM 314 may maintain subscription information for UEs 102, manage subscriptions, generate authentication credentials, handle user identification, perform access authorization based on subscription data, perform network function registration management, maintain service and/or session continuity by maintaining assignment of an SMF for ongoing sessions, support SMS delivery, support lawful intercept functionality, and/or perform other processes associated with managing user data. UDM 314 may store the data that it manages in a Unified Data Repository (UDR). UDM 314 may provide 5QIs/QCIs associated with UE 102, network slice IDs associated with UE 102, and SPIDs associated with UE 102, to other network components, such as RRP system 302.

MME 316 may implement 4G control plane processing for core network 206. For example, MME 316 may manage the mobility of UE 102, implement tracking and paging procedures for UE 102, activate and deactivate bearers for UE 102, authenticate a user of UE 102, and/or interface to non-LTE radio access networks. A bearer may represent a logical channel with particular QoS requirements. MME 316 may also select a particular serving gateway (SGW) for a particular UE 102. MME 316 may play a similar role for 4G core network components as AMF 312 does for 5G core network components and may provide traffic-related information to RRP system 302.

HSS 318 may store subscription information associated with UEs 102 and/or information associated with users of UEs 102. For example, HSS 318 may store subscription profiles that include authentication, access, and/or authorization information. Each subscription profile may include information identifying UEs 102, authentication and/or authorization information for UEs 102, services enabled and/or authorized for UEs 102, device group membership information for UEs 102, and/or other types of information associated with UEs 102. HSS 318 may include user information and/or UE information that is consistent with the information stored at a UDR and/or managed by UDM 314. For example, HSS 318 may include SPID for each of user subscription profiles. HSS 318 may provide information to RRP system 302.

Figure 5:
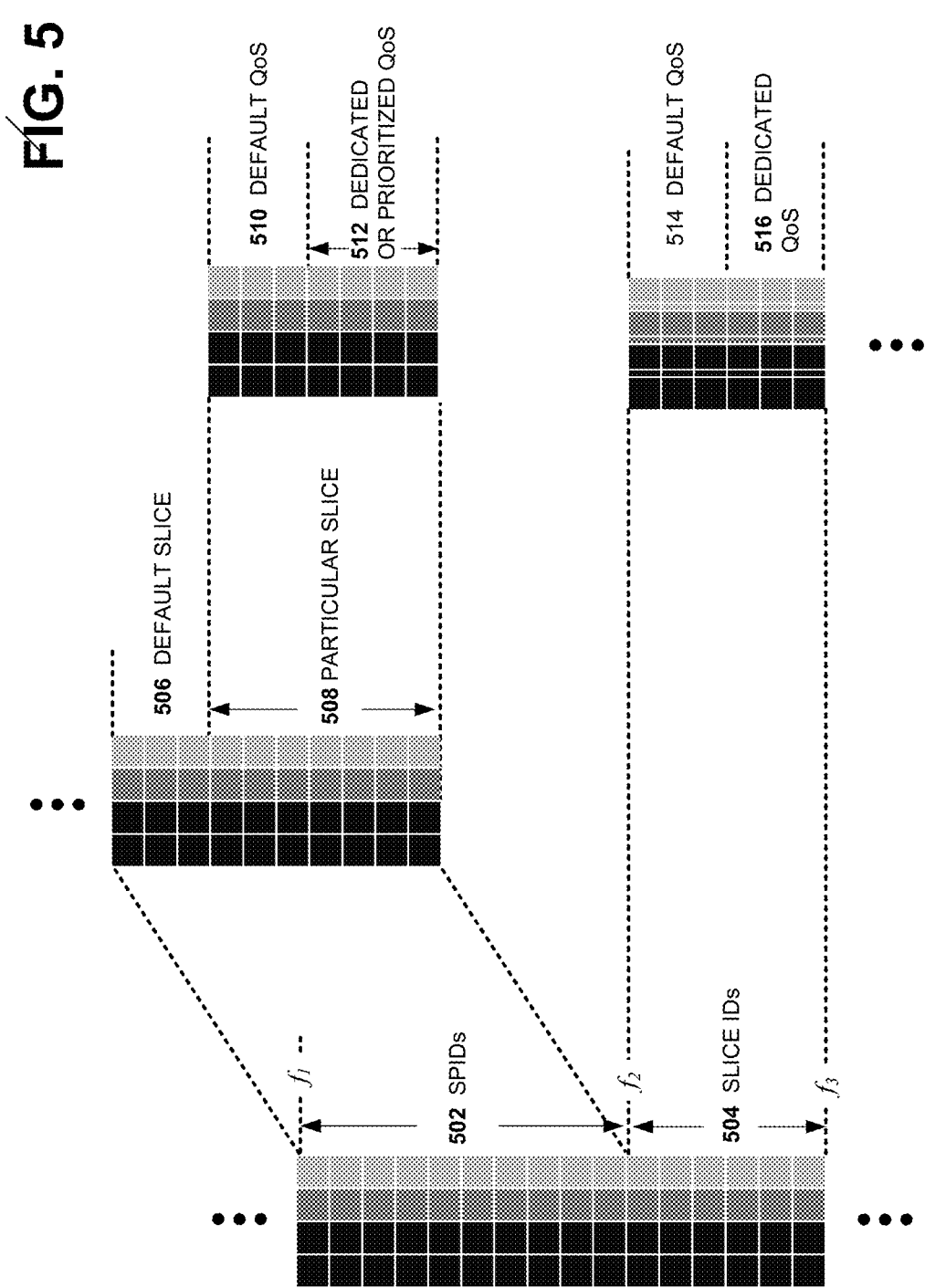
FIG. 5 illustrates example stages of a process for generating partition information for hierarchical management of radio resources, according to an implementation.

FIG. 5 illustrates example stages of a process for generating partition information for hierarchical management of radio resources, according to an implementation. The process may be performed by RRP system 302. The number of rectangles (e.g., representing PRBs, resource elements, etc.)

of a resource grid is for illustrative purposes, and in an actual implementation, a resource grid may include additional or fewer resource blocks than those illustrated in FIG. 5. As shown, at a first stage, in frequency ranges where SA and NSA bands overlap (overlap partition 502), SA access station 210 or NSA access station 210 may divide overlap partition 502 into resource partitions for each SPID. In an NSA-only band (not shown), an NSA access station 210 may divide its resource grid into partitions based on SPIDs. In SA-only bands, SA access station 210 may divide SA-only partition 504 into smaller partitions based on network slice IDs.

At a second stage, SA access station 210 may further divide each radio resource partition resulting from dividing overlap partition 502 based on SPIDs into a resource partition 506 reserved for a default network slice ID and resource partitions 508 for different, particular, network slice IDs.

At a third stage, SA access station 210 may further divide resource partitions 508 for each network slice ID into a resource partition 510 for default QoS (which corresponds to a particular 5QI) and resource partitions 512 for dedicated or prioritized QoSs (which correspond to other 5QIs). Resource partition 504 for network slice IDs is divided into a resource partition 514 for a default QoS and resource partitions 516 for dedicated or prioritized QoSs. In addition, NSA access station 210 may further divide each of the resource partitions that resulted from dividing overlap partition 502 based on SPIDs to obtain a resource partition for a QCI corresponding to a default QoS and resource partitions for QCIs for dedicated or prioritized QoSs (not shown).

In the above process, RRP system 302 in SA and NSA access stations 210 may generate partition information that specifies resource partitions for each SPIDs, network slice IDs, 5QIs, and/or QCIs. After scheduler 304 receives the partition information, during traffic congestion, scheduler 304 may schedule data for transmission or reception based on priorities that scheduler 304 determines for each resource partition based on the corresponding network slice IDs, SPIDs, 5QIs, and/or QCIs.

Figure 6:
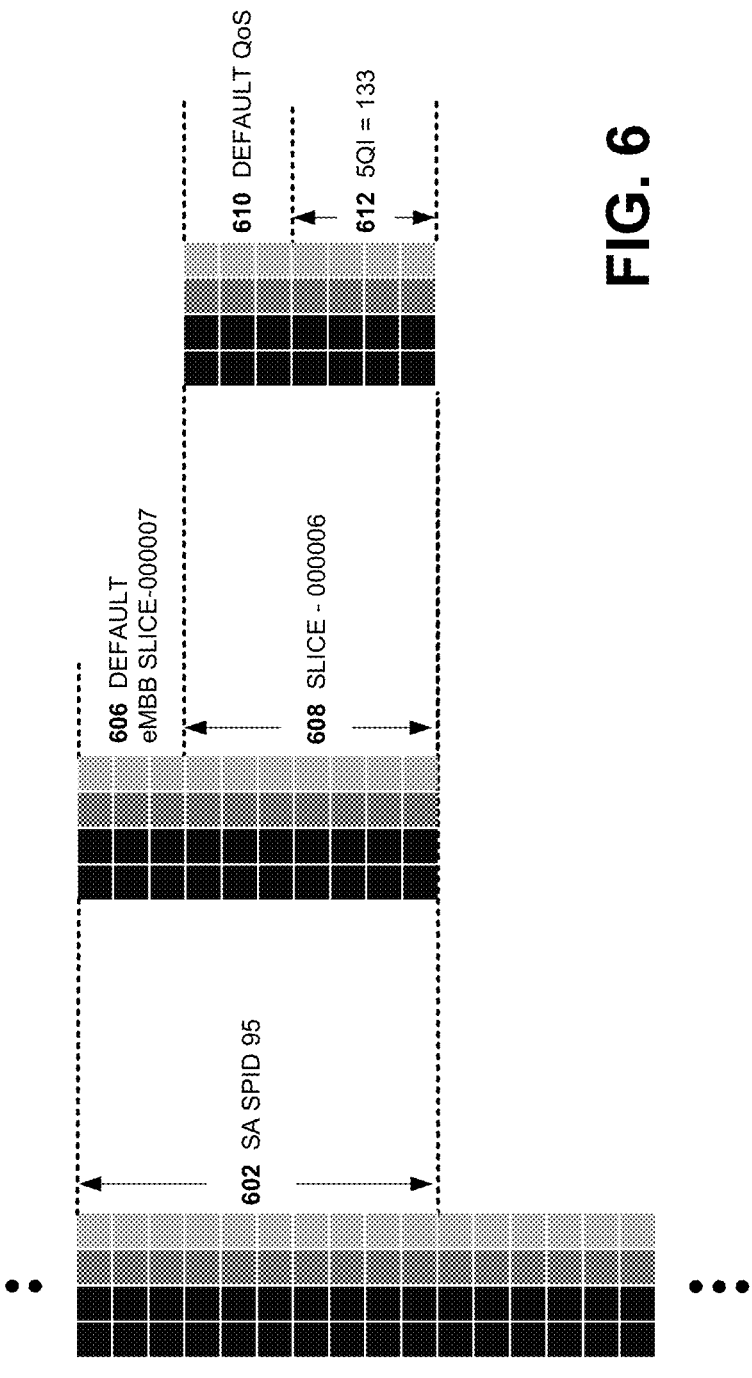
FIG. 6 illustrates an example application of a process for hierarchical management of radio resources, according to an implementation.

FIG. 6 illustrates an example application of the process described above for generating partition information, according to another implementation. The number of resource blocks is for illustrative purposes, and in an actual implementation, a resource grid may include additional or fewer resources. As shown, in the first stage, SA access station 210 may divide an overlap partition 602 based on a particular SPID of 95. In the second stage, SA access station 210 may further divide the resulting resource partitions into two partitions: a partition 606 for a default network slice with an S-NSSAI of 000007 for enhanced mobile broadband (eMBB); and a partition 608 for another network slice with an S-NSSAI of 000006. In the third stage, access station 210 may divide partition 608 into resource partitions 610 and 612. Resource partition 610 may be reserved for data with a default QoS and resource partition 612 may be allocated for a particular 5QI value of 133. RRP system 302 may provide the partition information resulting from the process to scheduler 304, for scheduling data for UEs 102 during traffic congestion.

FIG. 7A is a flow diagram of an exemplary process 700 for generating partition information, according to an implementation. Process 700 may be performed by RRP system 302 in combination with components 304 and 312-322. As shown, process 700 may include RRP system 302 dividing NSA-only bands and overlapping bands (bands that are in use by both SA and NSA networks), for both SA and NSA areas, based on SPIDs (block 702). In the NSA bands and the overlapping bands, for the NSA areas, each partition resulting from block 702 may be further divided into resource partitions based on QCI (block 704). RRP system 302 may then generate partition information for the resource partitions resulting from the dividing at blocks 702-704. In the overlapping bands, for the SA coverage areas, each partition resulting from block 702 may be further divided into partitions based on network slice IDs (block 706). RRP system 302 may then generate partition information for the resulting resource partitions (block 706).

Process 700 may further include RRP system 302 dividing a partition, in SA only bands, for SA coverage areas, based on network slice IDs (block 708) and generating partition information for the resource partitions resulting from the dividing (block 708). At block 710, RRP system 302 may further divide the resource partitions resulting from the dividing at blocks 706 and 708 based on 5QIs. RRP system 302 may then generate the corresponding partition information (block 710). RRP system 302 may provide the partition information resulting from blocks 704 and 710 to scheduler 304 (block 712).

Figure 7B:
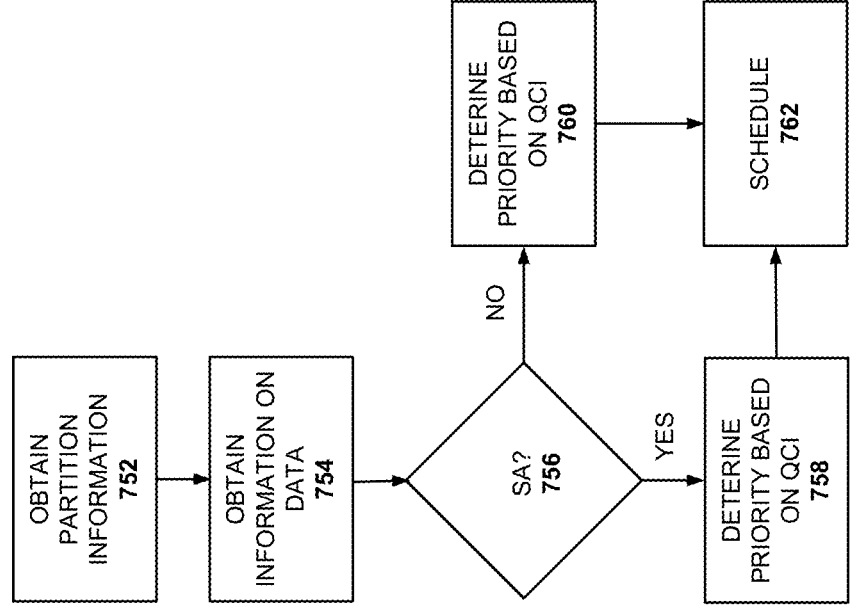
FIG. 7B is a flow diagram of an example process for using partition information for hierarchical management of radio resources, according to an implementation.

FIG. 7B is a flow diagram of an exemplary process 750 for using partition information for hierarchical management of radio resources, according to an implementation. Process 750 may be performed by scheduler 304 in combination with RRP system 302 and/or components 312-322. As shown, process 750 may include obtaining partition information (block 752). For example, RRP system 302 may generate partition information as described above with reference to FIGS. 3-7A and provide the partition information to scheduler 304. During network traffic congestion, when scheduler obtains information about data for UE 102 (either for transmission to UE 102 or reception from UE 102) (block 754), scheduler 304 may determine whether access station 210 that hosts scheduler 304 is a SA access station (in a SA area) or a NSA access station (in an NSA area) (block 706). The information about the data may include, for example, the amount of data to be transmitted or received, 5QI/QCI associated with the data, the network slice ID, and/or SPID for the UE 102. Some of the information may be obtained directly from AMF 312, UDM 314 or HSS 318 or indirectly from AMF 312, UDM 314 or HSS 318 via NEF 322.

If scheduler 304 determines that access station 210 is an SA access station (block 756: YES), scheduler 304 may identify the priority of the data for UE 102 based on the 5QI associated with the data (block 758). On the other hand, if scheduler 304 determines that station 210 is an NSA access station (block 756: NO), scheduler 304 may identify the priority of the data for UE 102 based on the QCI associated with the data (block 760).

Once scheduler 304 identifies the priority of the data, scheduler 304 may schedule the data (block 762). For example, based on the SPID, network slice ID, QCI/and 5QI, scheduler 304 may identify the radio resource partition for the data. After scheduler 304 identifies the partition, scheduler 304 may assign the data to the radio resources in the partition in accordance with the priority of the data and priorities of other data to be transmitted/received over the identified partition.

Figure 8:
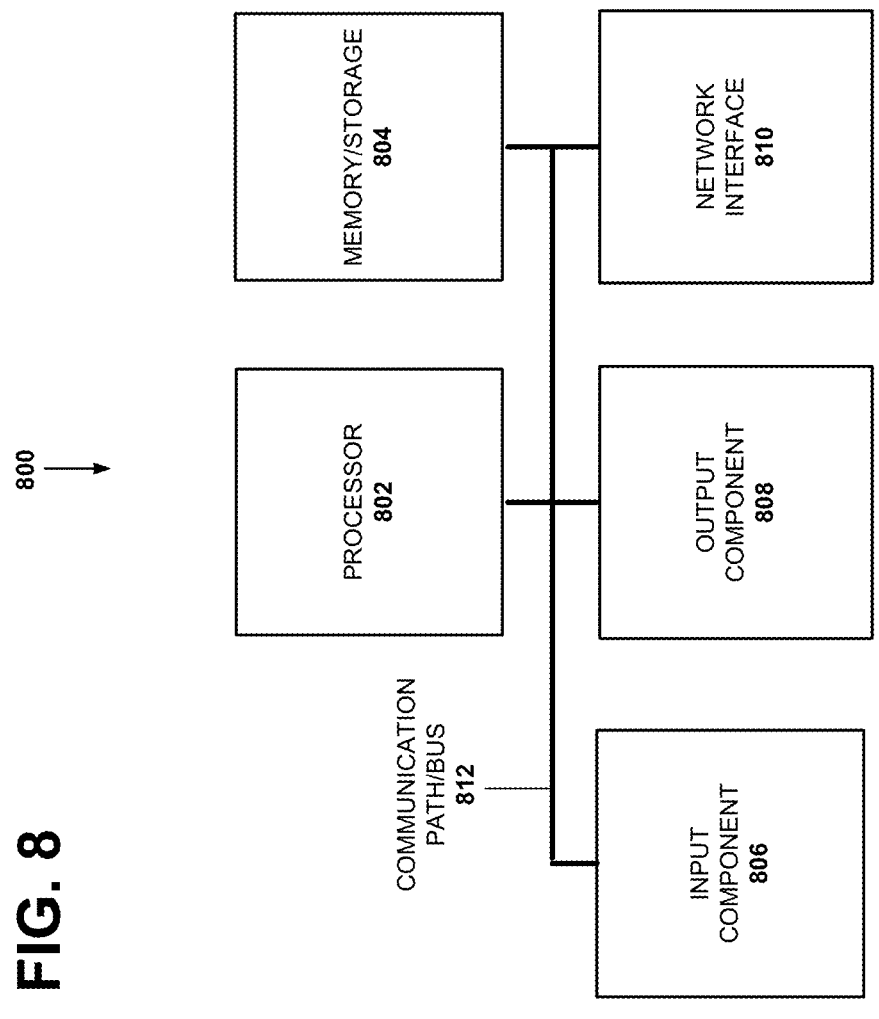
FIG. 8 depicts exemplary functional components of a network device according to an implementation.

FIG. 8 depicts exemplary components of a network device 800. Network device 800 may correspond to or be included in any of the devices and/or components illustrated in FIGS. 1, 2, 3, 4A, and 4B (e.g., network 202, UE 102, access network 204, core network 206, data network 208, gNB 210-1, gang 210-2, in 210-3, core network components 312-322, RRP system 302, scheduler 304, etc.). In some implementations, network devices 800 may be part of a hardware network layer on top of which other network layers and NFs may be implemented. As shown, network device 800 may include a processor 802, memory/storage 804, input component 806, output component 808, network interface 810, and communication path 812. In different implementations, network device 800 may include additional, fewer, different, or different arrangement of components than the ones illustrated in FIG. 8. For example, network device 800 may include line cards, switch fabrics, modems, etc.

Processor 802 may include a processor, a microprocessor, an Application Specific Integrated Circuit (ASIC), a Field Programmable Gate Array (FPGA), programmable logic device, chipset, application specific instruction-set processor (ASIP), system-on-chip (SoC), central processing unit (CPU) (e.g., one or multiple cores), microcontrollers, and/or other processing logic (e.g., embedded devices) capable of controlling network device 800 and/or executing programs/instructions.

Memory/storage 804 may include static memory, such as read only memory (ROM), and/or dynamic memory, such as random access memory (RAM), or onboard cache, for storing data and machine-readable instructions (e.g., programs, scripts, etc.). Memory/storage 804 may also include a CD ROM, CD read/write (R/W) disk, optical disk, magnetic disk, solid state disk, holographic versatile disk (HVD), digital versatile disk (DVD), and/or flash memory, as well as other types of storage device (e.g., Micro-Electromechanical system (MEMS)-based storage medium) for storing data and/or machine-readable instructions (e.g., a program, script, etc.). Memory/storage 804 may be external to and/or removable from network device 800. Memory/storage 804 may include, for example, a Universal Serial Bus (USB) memory stick, a dongle, a hard disk, off-line storage, a Blu-Ray® disk (BD), etc. Memory/storage 804 may also include devices that can function both as a RAM-like component or persistent storage, such as Intel® Optane memories.

Depending on the context, the term "memory," "storage," "storage device," "storage unit," and/or "medium" may be used interchangeably. For example, a "computer-readable storage device" or "computer-readable medium" may refer to both a memory and/or storage device.

Input component 806 and output component 808 may provide input and output from/to a user to/from network device 800. Input/output components 806 and 808 may include a display screen, a keyboard, a mouse, a speaker, a microphone, a camera, a DVD reader, USB lines, and/or other types of components for obtaining, from physical events or phenomena, to and/or from signals that pertain to network device 800.

Network interface 810 may include a transceiver (e.g., a transmitter and a receiver) for network device 810 to communicate with other devices and/or systems. For example, via network interface 810, network device 800 may communicate over a network, such as the Internet, an intranet, cellular, a terrestrial wireless network (e.g., a WLAN, WIFI, WIMAX, etc.), a satellite-based network, optical network, etc. Network interface 810 may include a modem, an Ethernet interface to a LAN, and/or an interface/connection for connecting network device 800 to other devices (e.g., a Bluetooth interface).

Communication path or bus 812 may provide an interface through which components of network device 800 can communicate with one another.

Network device 800 may perform the operations described herein in response to processor 802 executing software instructions stored in a non-transient computer-readable medium, such as memory/storage 804. The software instructions may be read into memory/storage 804 from another computer-readable medium or from another device via network interface 810. The software instructions stored in memory/storage 804, when executed by processor 802, may cause processor 802 to perform one or more of the processes that are described herein.

In this specification, various preferred embodiments have been described with reference to the accompanying drawings. It will be evident that modifications and changes may be made thereto, and additional embodiments may be implemented, without departing from the broader scope of the invention as set forth in the claims that follow. The specification and drawings are accordingly to be regarded in an illustrative rather than restrictive sense.

Figure 7B:

In the above, while series of actions have been described with reference to FIGS. 5, 6, and 7. the order of the actions may be modified in other implementations. In addition, non-dependent actions, messages, and signals that can be performed in parallel and in different orders. Furthermore, each of the actions may include one or more constituent actions.

It will be apparent that aspects described herein may be implemented in many different forms of software, firmware, and hardware in the implementations illustrated in the figures. The actual software code or specialized control hardware used to implement aspects does not limit the invention. Thus, the operation and behavior of the aspects were described without reference to the specific software code—it being understood that software and control hardware can be designed to implement the aspects based on the description herein.

Further, certain portions of the implementations have been described as "logic" that performs one or more functions. This logic may include hardware, such as a processor, a microprocessor, an application specific integrated circuit, or a field programmable gate array, software, or a combination of hardware and software.

To the extent the aforementioned embodiments collect, store or employ personal information provided by individuals, it should be understood that such information shall be collected, stored, and used in accordance with all applicable laws concerning protection of personal information. The collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, block, or instruction used in the present application should be construed as critical or essential to the implementations described herein unless explicitly described as such. Also, as used herein, the articles "a," "an," and "the" are intended to include one or more items. Further, the phrase "based on" is intended to mean "based, at least in part, on" unless explicitly stated otherwise.

What is claimed is:

1. A system comprising:
a device configured to:
divide a resource grid, which comprises a map of time-frequency locations for carrying modulation symbols, into first partitions based on:
subscriber profile identifiers (SPIDs),
a combination of SPIDs and network slice identifiers (IDs), or
one or more network slice IDs and no SPID;
divide the first partitions into second partitions based on Fifth Generation (5G) Quality-of-Service (QoS) Identifiers (5QIs) or QoS class Identifiers (QCIs);
generate partition information based on the first partitions and the second partitions; and
provide the partition information to a scheduler for scheduling data for transmission to or reception from a User Equipment device (UE).

2. The system of claim 1, wherein when the device is configured to divide the radio resource grid into the first partitions based on the combination of the SPIDs and the network slice IDs, the device is configured to:
divide the radio resource grid to obtain intermediate partitions based on the SPIDs, and
divide the intermediate partitions to obtain the first partitions based on the network slice IDs,
wherein the device is included in a 5G New Radio (NR) standalone (SA) access station, and
wherein the first partition is in frequency ranges for use in both a 5G NR SA architecture and a 5G NR non-standalone (NSA) architecture.

3. The system of claim 2, wherein the second partitions include a partition that corresponds to a network slice ID for a default network slice.

4. The system of claim 1, wherein when the device is configured to divide the radio resource grid into the first partitions based on the one or more network slice IDs and no SPID, the device is configured to:
divide the radio resource grid to obtain the first partitions based on the one or more network slice IDs,
wherein the device is included in a 5G New Radio (NR) standalone (SA) access station, and
wherein the first partition is in frequency ranges for use in a 5G NR SA architecture and not in a 5G NR NSA architecture.

5. The system of claim 1, wherein the system comprises a Next Generation Node B (gNB) that includes the device and the scheduler.

6. The system of claim 5, wherein the scheduler is configured to:
receive information related to the data, wherein the information includes a 5QI; and
when communication channels between the gNB and UEs are congested,
determine a priority of the data for scheduling based on the 5QI and the partition information; and
schedule the data for transmission based on the priority.

7. The system of claim 5, wherein the scheduler is configured to:
receive information related to the data from a Unified Data Management (UDM) in a 5G core network connected to the gNB.

8. The system of claim 1, wherein the first partitions comprise one or more of:
physical resource blocks (PRBs); or
resource elements.

9. The system of claim 1, wherein the second partitions include a partition that corresponds to a 5QI that indicates a default QoS.

10. A method comprising:

dividing a resource grid, which comprises a map of time-frequency locations for carrying modulation symbols, into first partitions based on:

subscriber profile identifiers (SPIDs), a combination of SPIDs and network slice identifiers (IDs), or one or more network slice IDs and no SPID;

dividing the first partitions into second partitions based on Fifth Generation (5G) Quality-of-Service (QOS) Identifiers (5QIs) or QoS class Identifiers (QCIs);

generating partition information based on the first partitions and the second partitions; and providing the partition information to a scheduler for scheduling data for transmission to or reception from a User Equipment device (UE).

11. The method of claim 10, wherein dividing the radio resource grid into the first partitions based on the combination of the SPIDs and the network slice IDs includes:

dividing the radio resource grid to obtain intermediate partitions based on the SPIDs, and dividing the intermediate partitions to obtain the first partitions based on the network slice IDs, wherein the first partition is in frequency ranges for use in both a 5G New Radio (NR) standalone (SA) architecture and a 5G NR non-standalone (NSA) architecture.

12. The method of claim 11, wherein the second partitions include a partition that corresponds to a network slice ID for a default network slice.

13. The method of claim 10, wherein dividing the radio resource grid into the first partitions based on the one or more network slice IDs and no SPID includes:

dividing the radio resource grid to obtain the first partitions based on the one or more network slice IDs, wherein the first partition is in frequency ranges for use in a 5G New Radio (NR) standalone (SA) architecture and not in a 5G NR NSA architecture.

14. The method of claim 11, wherein a Next Generation Node B (gNB) includes the scheduler.

15. The method of claim 14, wherein the scheduler is configured to:

receive information related to the data, wherein the information includes a 5QI; and when communication channels between the gNB and UEs are congested, determine a priority of the data for scheduling based on the 5QI and the partition information; and schedule the data for transmission based on the priority.

16. The method of claim 14, wherein the scheduler is configured to:

receive information related to the data from a Unified Data Management (UDM) in a 5G core network connected to the gNB.

17. The method of claim 10, wherein the first partitions comprise one or more of:

physical resource blocks (PRBs); or resource elements.

18. The method of claim 10, wherein the second partitions include a partition that corresponds to a 5QI that indicates a default QoS.

19. A non-transitory computer-readable medium comprising processor-executable instructions, which when executed by a processor cause the processor to:

divide a resource grid, which comprises a map of time-frequency locations for carrying modulation symbols, into first partitions based on:

subscriber profile identifiers (SPIDs), a combination of SPIDs and network slice identifiers (IDs), or one or more network slice IDs and no SPID;

divide the first partitions into second partitions based on Fifth Generation (5G) Quality-of-Service (QOS) Identifiers (5QIs) or QoS class Identifiers (QCIs);

generate partition information based on the first partitions and the second partitions; and provide the partition information to a scheduler for scheduling data for transmission to or reception from a User Equipment device (UE).

20. The non-transitory computer-readable medium of claim 19, wherein the first partitions comprise one or more of:

physical resource blocks (PRBs); or resource elements.

* * * * *